Jan. 6, 1942.   H. A. KNOX   2,268,601
VEHICLE
Filed Aug. 21, 1940   4 Sheets-Sheet 1

INVENTOR
Harry A. Knox
BY
ATTORNEYS

Jan. 6, 1942.  H. A. KNOX  2,268,601
VEHICLE
Filed Aug. 21, 1940  4 Sheets-Sheet 2
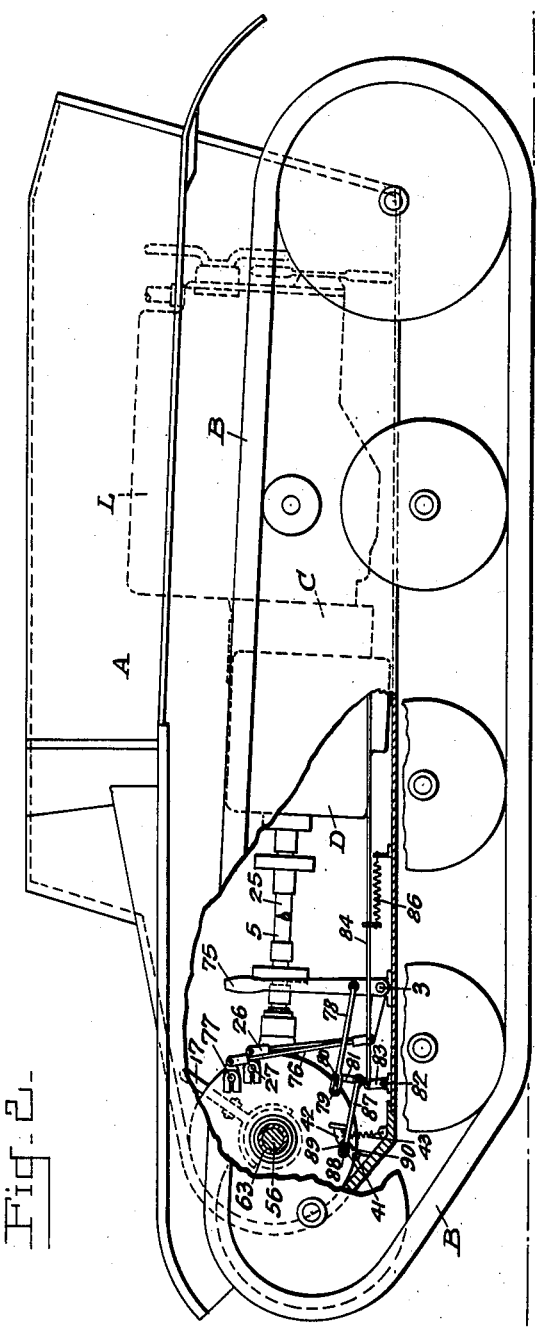
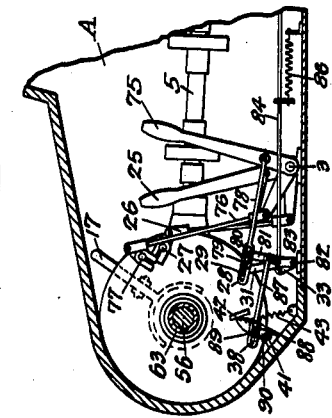
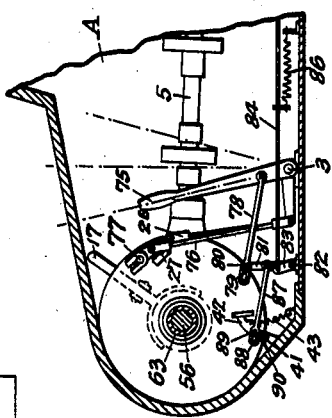
INVENTOR
Harry A. Knox
BY Kessenich + Church
ATTORNEYS Jan. 6, 1942.  H. A. KNOX  2,268,601
VEHICLE
Filed Aug. 21, 1940   4 Sheets-Sheet 3
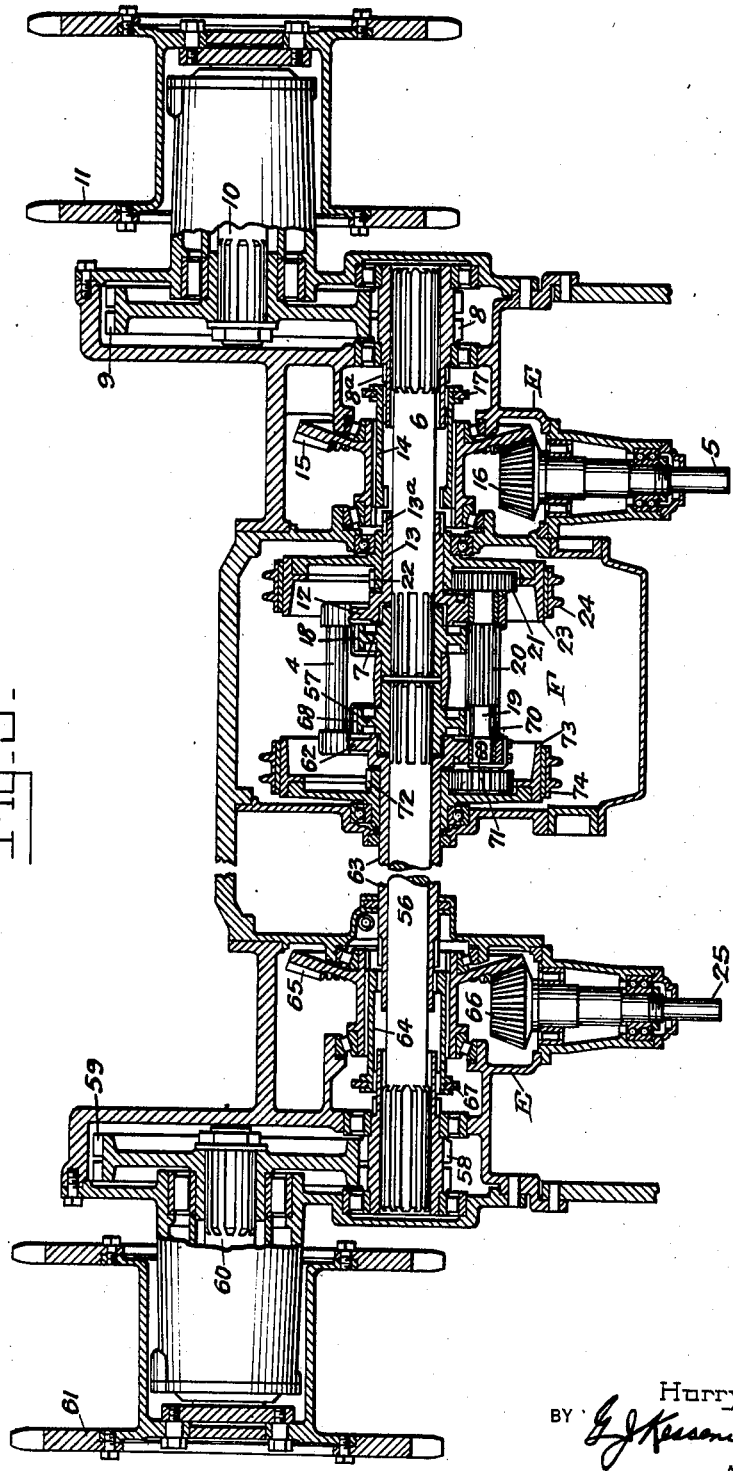

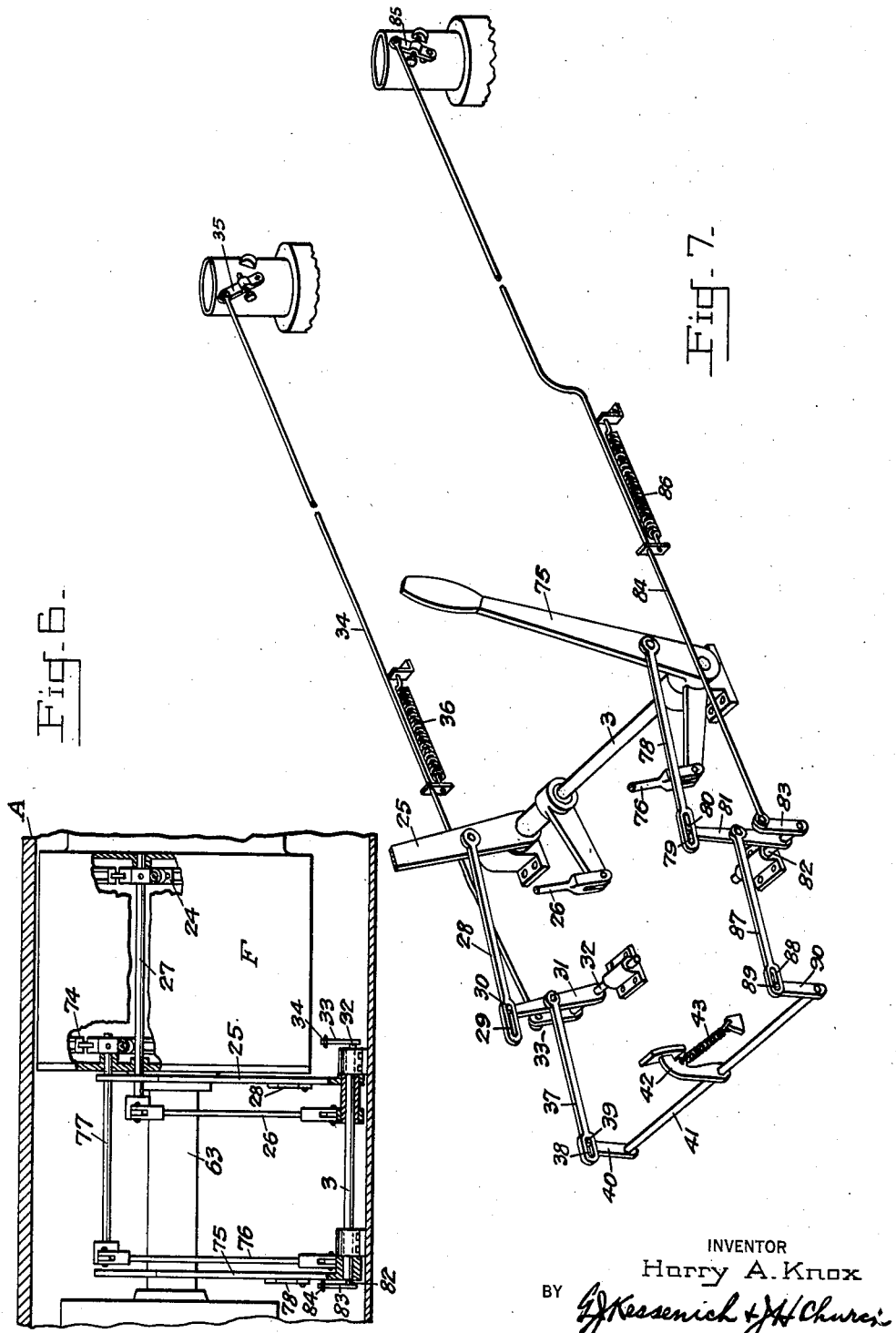

Patented Jan. 6, 1942

2,268,601

UNITED STATES PATENT OFFICE 2,268,601

VEHICLE

Harry A. Knox, Washington, D. C.

Application August 21, 1940, Serial No. 353,528

10 Claims. (Cl. 180—9.2)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a vehicle of the tracklaying type in which steering is accomplished by driving the tracks at different speeds.

The purpose of the invention is to provide a vehicle in which the power from two engines may be transmitted to a single controlled differential gear mechanism or to the final drive of the tracks on the corresponding side of the vehicle. The arrangement permits the engines to be used together or separately to propel the vehicle and a steering control mechanism is provided for the various combinations of power transmission.

The specific nature of the invention as well as other objects and advantages thereof will clearly appear from a description of a preferred embodiment as shown in the accompanying drawings in which:

Fig. 2 is a view in side elevation with parts broken away to show the hand levers in position to close the throttles and before applying the steering brakes;

Fig. 3 is a view in side elevation with the hand levers in position to open the throttles;

Fig. 4 is a similar view with the hand levers set for a left turn;

Fig. 5 is a transverse sectional view through the controlled differential and final drive on the line 5—5 of Fig. 1;

Fig. 6 is a view on the line 6—6 of Fig. 1;

Fig. 7 is a perspective view of the steering controls set for a left turn.

Figure 1:
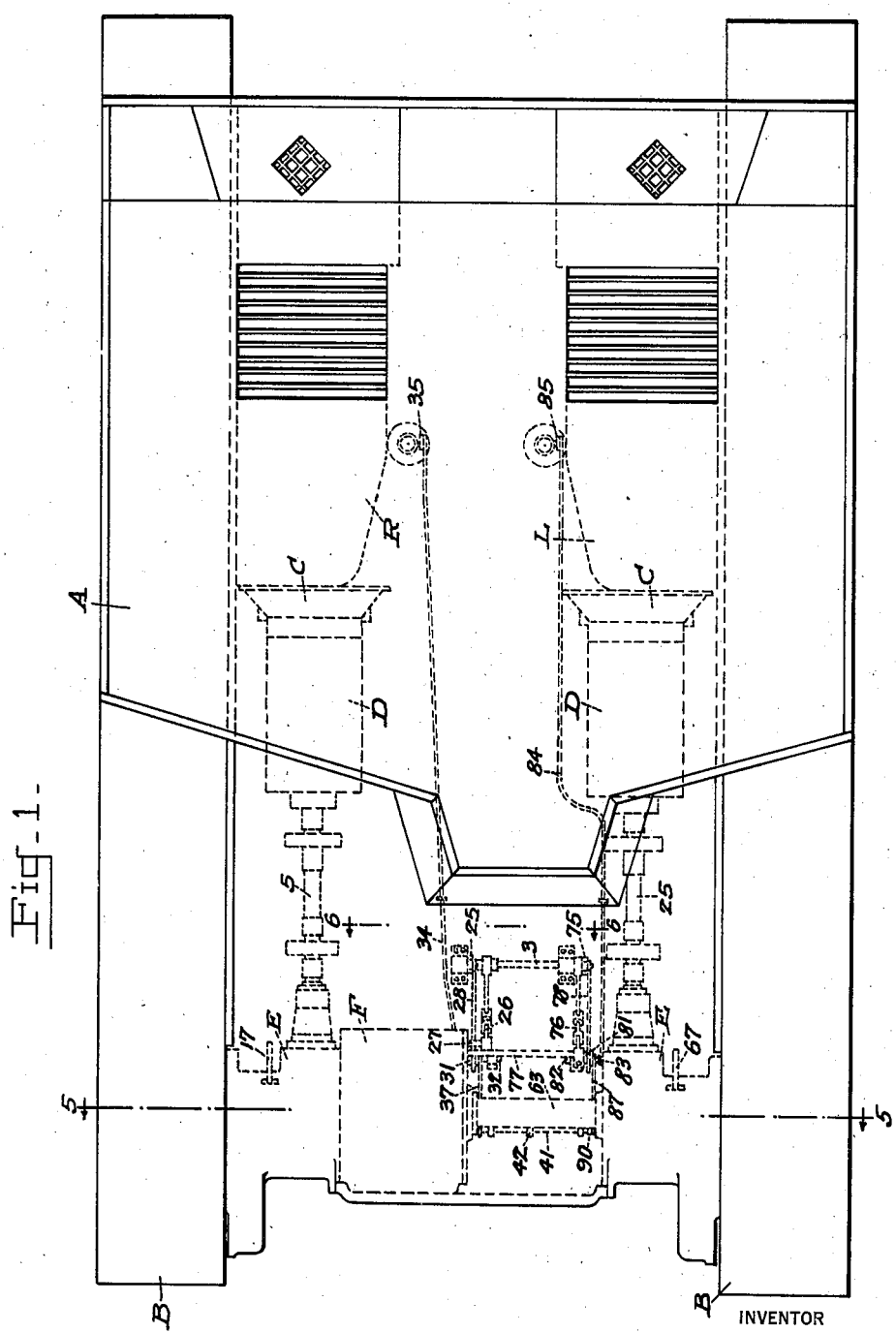
Fig. 1 is a plan view of a vehicle constructed in accordance with the invention.

Referring to Fig. 1 there is shown a vehicle A including a pair of endless tracks B—B. A pair of independent power plants or enginges R and L each including a master clutch C and transmission mechanism D are disposed in the vehicle and respectively drive the shafts 5 and 25 which lead into the casing E.

Referring to Fig. 5 a pair of coaxial axle shafts 6 and 56 mounted in the casing have their adjacent inner ends splined to the compensating gears 7 and 57 of a controlled differential unit F of well known construction. The outer ends of the shafts are splined to spur pinions 8 and 58 which mesh with spur gears 9 and 59. The spur gears are splined on offset stub shafts 10 and 60 which carry sprockets 11 and 61 for the right and left tracks B—B.

The carrier of the controlled differential unit F comprises a right plate 12 and a left plate 62 connected by bolts 4. The plate 12 includes a sleeve 13 rotatably mounted on the shaft 6 and the plate 62 includes a sleeve 63 rotatably mounted on the shaft 56. The spur pinion 8 and the sleeve 13 are provided with teeth 8a and 13a for engagement with the teeth on a sleeve clutch 14. The clutch 14 is slidably keyed within the hub of a bevel gear wheel 15 which meshes with a pinion 16 on the drive shaft 5. A clutch lever 17 is provided for moving the clutch from a neutral position into selective engagement with the pinion 8 or sleeve 13.

The compensating gear wheels 7 and 57 splined on the adjacent ends of the shafts 6 and 56 have their teeth 18 and 68 disposed within the elements forming the carrier. A shaft 19 journaled in the plates 12 and 62 carries an inner pinion 20 meshing with gear 18 and an outer pinion 21 meshing with gear 22 on brake drum 23 which is arranged to be retarded or arrested by a brake band 24.

On the left side of the differential the counterparts of the members numbered 12 to 24 are designated from 62 to 74.

The mechanism for actuating the brake bands 24 and 74 is shown in Fig. 6 and comprises a hand lever 25, link 26 fixed thereto, and shaft 27 for the right band 24 and a hand lever 75, link 76 fixed thereto, and shaft 77 for the left band 74. The steering levers 25 and 75 are mounted by means of a common rod 3.

Referring to Fig. 7 the throttle controls for the two engines are similar and only one will be described in detail. A link 28 carried by the lever 25 is formed at its front end with a slot 29 which receives a pin 30 on a lever 31. The lever 31 is fixed to a shaft 32 which carries a second lever 33. A rod 34 connects the lever 33 with a throttle lever 35. A spring 36 acts to normally retract the rod 34 to close the throttle. A link 37 carried by the lever 31 is formed at its front end with a slot 38 which receives a pin 39 on a lever 40. The lever 40 is fixed to a rod 41 which carries a foot lever 42 normally retracted by a spring 43.

On the left side the counterparts of the members 28 to 40 are designated from 78 to 90.

The throttle controls are arranged so that the hand levers 25 and 75 and the foot lever 42 function independently of one another.

Steering of the vehicle is accomplished by varying the engine speed, by means of the controlled differential, or by a combination of these.

In the normal method of operation with both engines supplying power the sleeve clutches 14 and 64 are engaged with the spur pinions 8 and 58. With the hand levers 25 and 75 in forward position the tracks B—B are driven at the same speed and the vehicle proceeds on a straight course. When it is desired to make a left turn the left hand lever 75 is retracted as indicated in Fig. 7 to close the throttle 85 and retard the left track, the degree of movement of the lever 75 from its forward position to a vertical position determining the radius of the turn. The movement of the lever 75 rearwardly of the vertical position serves to apply the left brake band 74 and the left shaft 56 is further retarded through the differential.

In another method of steering when both engines are supplying power the clutches 14 and 64 are engaged with the sleeves 13 and 63 of the differential. Power and speed of both engines is regulated by the foot lever 42 and steering is accomplished by selectively applying the brake bands 24 and 74 of the controlled differential through operation of the hand levers 25 and 75. As seen in Fig. 7 with the lever 75 retracted to apply brake band 74 the pin 80 is at the center of the slot 79 so that the rod 84 to the throttle may be moved forwardly through the foot lever 42 without disturbing the action of the steering brake.

Stopping of the vehicle is accomplished by throwing out the master clutches C—C and placing the transmissions D—D in neutral.

When only one engine is to be employed to propel the vehicle the sleeve clutch 14 or 64 of the appropriate engine is placed in neutral position to disconnect that engine from its final drive while the sleeve clutch of the other engine is engaged with the differential through the appropriate sleeve 13 or 63. Power and speed of the operative engine is regulated by the foot lever 42 and steering is accomplished by selectively applying the brake bands 24 and 74 through operation of the hand levers 25 and 75.

While the hand levers 25 and 75 have been shown as separate members it will be understood that they may be associated with a steering device similar to that used in aircraft.

I claim:

1. In a vehicle, a controlled differential gear mechanism including a pair of brake bands and a rotatable carrier having oppositely extending sleeves, a pair of axle shafts one in each sleeve associated with the differential mechanism, a final drive member on each axle shaft, a pair of engines, means for selectively clutching each engine to the differential carrier or to the final drive member of one axle shaft, a throttle for each engine, a hand lever for each throttle, means for operating one of the brake bands from each hand lever, and a lever for controlling the throttles independently of the hand levers.

2. In a vehicle, a controlled differential gear mechanism including a pair of brake bands and a rotatable carrier having oppositely extending sleeves, a pair of axle shafts one in each sleeve associated with the differential mechanism, a final drive member on each axle shaft, a pair of engines, means for selectively clutching each engine to the differential carrier or to the final drive member of one axle shaft, a throttle for each engine, a hand lever for each throttle, and means for operating one of the brake bands from each hand lever.

3. In a vehicle, a controlled differential gear mechanism including a pair of brake bands and a rotatable carrier, a pair of axle shafts associated with the differential mechanism, a final drive member on each axle shaft, a pair of engines, means for clutching each engine to the differential carrier, a throttle for each engine, a hand lever for each throttle, means for operating one of the brake bands from each hand lever, and a foot lever for controlling the throttles independently of the hand levers.

4. In a vehicle, a controlled differential gear mechanism including a pair of brake bands and a rotatable carrier, a pair of axle shafts associated with the differential mechanism, a final drive member on each axle shaft, a pair of engines, means for clutching each engine to the final drive member of one axle shaft, a throttle for each engine, a hand lever for each throttle, and means for operating one of the brake bands from each hand lever.

5. In a vehicle, a controlled differential gear mechanism including steering brakes and a pair of axle shafts, a final drive member on each axle shaft, a pair of engines, and means for selectively clutching each engine to the controlled differential or to the final drive member of one axle shaft.

6. In a vehicle including a pair of tracks, a final drive for each track, a single controlled differential gear mechanism for both tracks and including a carrier, a pair of engines, means for selectively clutching each engine to the differential carrier or to the final drive of one track, a throttle control for each engine, and means for controlling the tracks through the differential.

7. In a vehicle including a pair of tracks, a single controlled differential gear mechanism for both tracks, a pair of engines, and means for selectively driving the tracks either from the engines directly or through the differential gear mechanism.

8. In a vehicle including a pair of tracks, a single controlled differential gear mechanism including a carrier and a pair of axle shafts, a pair of engines, means for selectively clutching each engine to the carrier or one axle shaft, means for steering by driving with both engines, and means for steering by driving with either engine alone.

9. In a vehicle including a pair of driven members, a pair of engines each having a throttle, a controlled differential gear mechanism with a pair of steering brakes, and means for selectively driving said members either directly from said engines or through said differential gear mechanism, a hand lever for each throttle and operable after closing the throttle to apply a steering brake, and a lever for controlling the throttles independently of the hand levers.

10. In a vehicle including a pair of driven members, a pair of engines each having a throttle, a controlled differential gear mechanism with a pair of steering brakes, and means for selectively driving said members either directly from said engines or through said differential gear mechanism, a throttle rod for each throttle, a hand lever including a slotted link for each throttle rod and operable after closing the throttle to apply a steering brake.

HARRY A. KNOX.